INVENTOR.
HOWARD DEANS

March 7, 1967 H. DEANS 3,308,003
ULTRASONIC SEALING APPARATUS
Filed Feb. 16, 1962 3 Sheets-Sheet 3
FIG. 10
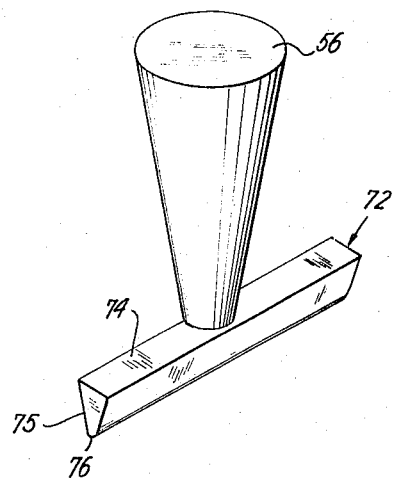
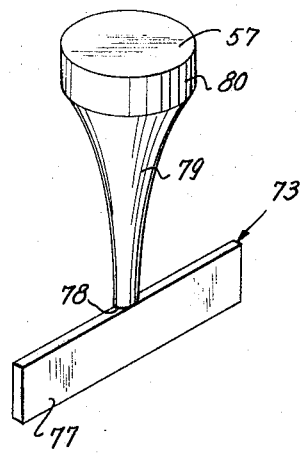
FIG. 11
INVENTOR.
HOWARD DEANS
BY
ATTORNEY

3,308,003
ULTRASONIC SEALING APPARATUS
Howard Deans, Secane, Pa., assignor to Kleer-Vu
Industries, Inc., New York, N.Y.
Filed Feb. 16, 1962, Ser. No. 173,750
1 Claim. (Cl. 156—580)

This application is a continuation-in-part of application Serial No. 99,504, filed March 30, 1961, now U.S. Patent No. 3,222,239, and application Serial No. 173,178, filed February 14, 1962, now abandoned.

The present invention relates to an ultrasonic sealing apparatus and it particularly relates to an apparatus which may be utilized in connection with various types of ultrasonic sealing tools.

Although not limited thereto, the present invention will be particularly described in its application to a variety of sealing, cutting and working tools which may be utilized in connection with an ultrasonic sealing apparatus.

It is among the objects of the present invention to provide a tool arrangement for an ultrasonic sealing system having a very high frequency which will rapidly and reliably seal together thin sheets of plastic material or woven or knitted or matted materials at a relatively high rate of production with a minimum of labor.

Another object is to provide a tool arrangement for an ultrasonic sealing system, widely useful for making, sealing, cutting or otherwise processing polyethylene, vinyl polymer tubing, sleeves, bags, envelopes, fabrics and even articles of clothing out of various thermoplastic materials in sheet or woven forms, and particularly out of synthetic plastic material such as nylon, Mylar, Dacron or Orlon, or woven, knitted or matted fibrous materials.

A further object of the present invention is to provide a novel ultrasonic tooling system for cutting, spot or line sealing, folding, splicing, applique attachment, and for the production of tubes and belts as well as various types of ribbons or enclosures from thin sheet plastic materials of the nature of polyethylene or vinyl polymers, nylon, Mylar, Dacron, Orlon or even woven, knitted or matted fibrous materials.

Still further objects and adavntages will appear in the more detailed description set forth below, it being understood, however, that this more detailed description is given by way of limitation, since various changes therein may be made by those skilled in the art without departing from the scope and spirit of the present invention.

In accomplishing the above objects, it has been found most satisfactory to cause substantial integral spot or line sealing of two or more thin sheet materials placed in superimposed relationship by the kinetic energy released internally in the material by the mechanical hammering action of a tool vibrating at very high frequencies in contact with a plastic, such vibrational velocity being preferably above 18,000 oscillations per second.

It is most important that the oscillatory rate be much above the audio-frequency rate to achieve the desired results, since in the audio-range with high powered outputs the device is commercially unsatisfactory.

In determining the best range to use, it has been found that the range just above audibility of about 20 to 30 kilocycles per second is most satisfactory.

In the preferred form of the device, the ultrasonic equipment consists of an electronic generator which produces the oscillatory electric energy of the proper frequency, combined with a transducer which converts the electrical energy into vibrating mechanical energy.

The driving or motor mechanism may desirably embody a spring-counterbalanced laminated metal stack having encircling energy coils to induce the high oscillatory rate. Preferably, the main armature or core element consists of a laminated nickel stack with bifurcated sections, each encircled by energy coils to which a high frequency alternating current source is applied, of the order of 25 kilocycles per second.

The entire motor is desirably enclosed in a casing having suitable supports and with suitable circulating air or liquid cooling means.

The lower part of the stack is connected to a suitable tool cone, which is a solid piece of metal in the shape of a cone whose large end is attached to the transducer.

The present invention is particularly directed to the tools which may be employed.

The depending converging tip is desirably used as the hammering tool, with the actual contact end being limited to a very small, constricted or concentrated application area.

The transducer thus described is desirably of the magnetostrictive type, which has high efficiency due to the expansion and contraction of a nickel rod when subjected to a high frequency oscillatory magnetic field.

The actual amplitude at the constricted, small application area is extremely limited and the power is achieved by the convergence and smallness and concentration of the high frequency to a very small area at which the pressure is concentrated.

In one preferred form the transducer and its attached cone is mounted perpendicular to a solid base or anvil and the plastic film to be bonded is hammered by the tool against the anvil.

The tool tip is so designed that there will be an extreme concentration of energy at its point of application to the two-three or more layers of film to be bonded together.

The transducer and tool desirably is loaded to weigh a few pounds, while the actual weld pressure produces a pressure of 1,000 pounds per square inch over and in a very small, compact area.

Desirably, where a weld such as a lap weld is to be produced, the tool tip may take the form of a transversely elongated half-cylinder on its side and brazed to the top of the inverted cone to produce a line contact toward the anvil.

Where two edges of plastic are to be joined together, they may be first butted against one another and then overlapped slightly, usually from .010 inch to .030 inch, with the axis of the cylinder tip being perpendicular to to the narrow lap.

The actual amount of oscillation is in the neighborhood of .0005 to .001 of an inch.

The vertical oscillatory transduced is desirably supported so as to permit a linear oscillatory motion with a minimum of friction, which will permit the oscillatory concentrated tip of the tool to penetrate into the plastic as the fusion occurs.

In one form, U-shaped arms and ball bearings are utilized for supporting the transducer housing to give a parallelogram-type of suspension, which is adequate for the small motions required.

As an alternative form of support, the transducer may be mounted in a tube moving freely within a ball bearing and giving a free linear motion to the assembly.

Desirably, the device also includes a counterweight to balance out the weight of the transducer, which may be accomplished by using a weighted transducer housing and a counterweighted lever frame, the weight of which may be adjustable by adding or subtracting weight or providing a manner of sliding weights along the arm in a scale fashion.

Desirably, for compactness, separate adjustable springs may be employed to give the weight application one spring pushing upward on the parallelogram suspension system to counter the weight of the transducer assembly on the other spring pushing downwardly and being provided with a screw adjustment to vary the amount of downward pressure.

In the preferred form of the invention, there is provided a dial gauge to indicate the amount of vertical penetration of the tool into the plastic sheet or other material.

There is also a screw or knob adjustment for accurate vertical positioning of the entire head, making the unit more versatile.

In addition there may be a manual or foot operated lift lever to lift the suspension system from the plastic sheet or woven or matted material when desired.

To provide for continuous seaming and treatment of plastic films or fabrics, a device is utilized to drive or pool the material beneath the tool tip, which may include the use of a wheel as an anvil having a rough or knurled surface to facilitate driving smooth films.

The knurling may also be made with any design, which in turn will show itself up in decorative designs in the weld area.

In the production of continuously seamed plastic tubing, sheet film may be first slit to accurate width and then fed into a flanged end tube which folds the flat sheet around into fashion, with the narrow overlap of two edges.

A solid round mandrel will be provided inside of the metal tube in which the plastic is formed, and this mandrel will serve as an anvil for the ultrasonic tool head.

A hole or opening in the center of the metal tube will permit tool access to the overlap seam and the execution of the seal.

To provide for continuous belt or loop welding, an anvil may be provided, consisting of a heavy, flat, round bar suspended on its ends in bridge fashion permitting the loop to pass below.

The bar is set in notches in two end uprights and may be lifted off to remove the loop after formation.

In this last mentioned form, the whole assembly will pass beneath the tool tip during welding.

Desirably, before welding or sealing, the electronic unit is tuned so that it will resonate with the natural mechanical frequency of the transducer and tool.

This is normally done manually, but occasionally it becomes desirable to have a method of automatic tuning where the frequency will be adjusted to vary back and forth across the resonant point and thus permit a slight mistuning.

The result will be a pulsed welding, according to which there will be a perfect resonance only once each swing.

This most readily available modulating frequency is a 60 cycle power source which, when applied to the complete circuit of an oscillator tube of sufficient rating, will modulate the frequency to a slight amount.

This will give a welding effect, even slightly off the exact resonance frequency so that more than half of the swingtime of the tool will result in an actual welding operation.

A further feature of the present invention also resides in the fact that a most effective application is achieved where the conical sealing heads are provided with curved side faces converging downwardly to the point of application.

It has also been found that with the desired tool structures and controlled thickness of plastic material being sealed, it is possible to cover relatively large areas by an elongated contact element which may range from 1 to 3″ in length and from 1/16 to 1/8″ in width particularly if applied to relatively heavy polyethylene terephthalate.

The same bar sealing procedure is applicable to other types of plastic film such as vinyl sheets, polyethylene sheets, fluorinated hydrocarbon sheets and the like.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings, wherein like reference characters denote corresponding parts throughout the several views:

FIG. 10 is a side perspective view showing a bar type tool head with an elongated bar for sealing relatively thicker plastic materials.

FIG. 11 is a side perspective view of a bar type sealing head relative to that of FIG. 6 showing a rectangular bar as forming a flat impact face.

Figure 1:
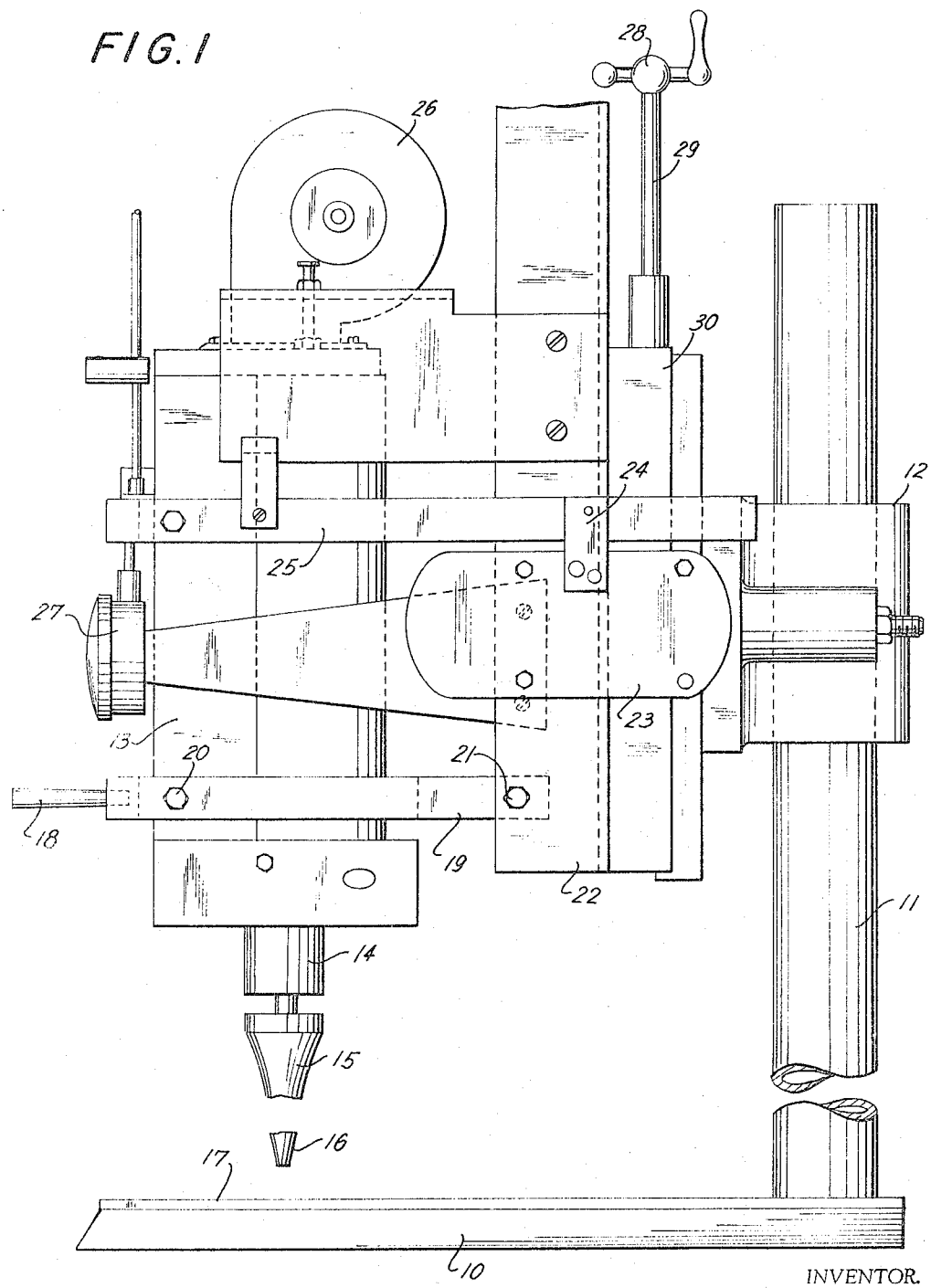
FIG. 1 is a side elevational view of a type of sealing arrangement in that it is accordingly useful to the present invention.

Referring to FIG. 1 there is shown a typical sealing machine having a base structure 10 supporting a vertical standard 11 of tubular form.

The standard 11 receives the collar 12 which enables the sealing unit to be vertically adjusted.

The collar 12 will carry the mechanism including the power generator 13 wtih the downwardly extending rod 14 carrying the tool 15 having its impact tip 16 applied against sheet plastic or other material on the anvil 17.

The handle 18 connected to the swinging bar 19 having the pivotal connection 20 to the structure 13 and a pivotal connection 21 to the support structure 22 will enable the tool impact face 16 to be lifted from the anvil 17 or to be lowered to contact with the material on the anvil 17.

The sliding weight 23 carried by the link 24 on the arm 25 will enable an adjustment of the pressure applied at the impact point 16.

The fan 26 will serve to force air through the transducer housing 13 and cool the same.

The dial 27 will enable termination of the position of the tool 15.

To adjust the position of the tool 16 in respect to the material on the anvil 17, the crank 28 may turn the shaft 29 to change the position of the unit structure at 30 and to correct any off reading on the dial 27.

By these adjustments, it is possible to determine the depth of tool penetration into the plastic and the type of operation that is desired whether to be sealing, cutting, forming or the like.

The present application is not specifically directed to the driver, transducer or head but is directed to the various tools that may be employed as set forth in FIGS. 2 to 11.

Referring to the tools of FIGS. 2 to 11, it will be noted that each has an enlarged upper head portion 50 to 57 all inclusive which may be engaged with a carrier as shown at 14 in FIG. 1.

Figure 3:
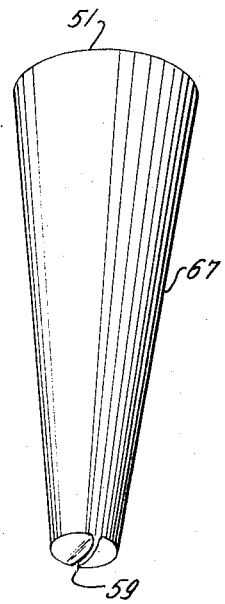
FIG. 3 is a side perspective view of a conical tool head having a semicircular blade head contact impact element.
Figure 4:
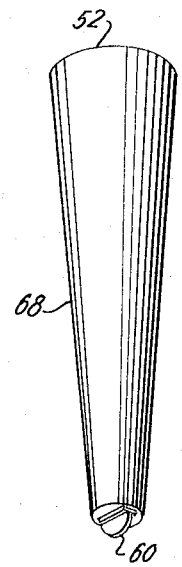
FIG. 4 is a perspective view of a conical tool head intermediate in size as between FIGS. 2 and 3 and with the semicircular blade acting as the impact element being shorter than the lower end of the tool.
Figure 7:
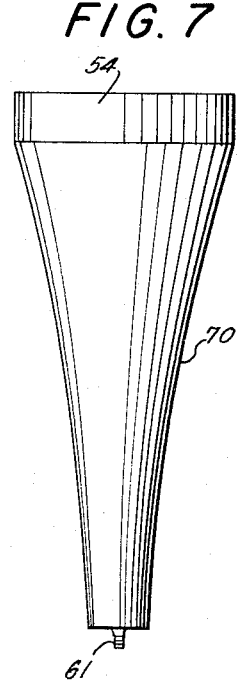
FIG. 7 is an edge elevational view of the tool head of FIG. 6.

The impact face is a small circular area as indicated at 58 in FIG. 3 or it is the semicircular blades 59 or 60 as indicated in FIG. 3 or 4 and as indicated at 61 in FIG. 7.

Figure 5:
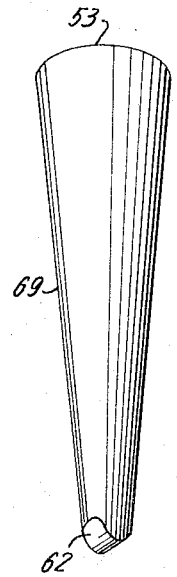
FIG. 5 is a perspective view of a conical tool head showing a rounded lower face having a sealing edge formed by causing the lowest portion of the tool to have a cylindrical face.

In FIG. 5, the entire lower end of the tool is cylindrically rounded as indicated at 62.

Figures 8, 9:
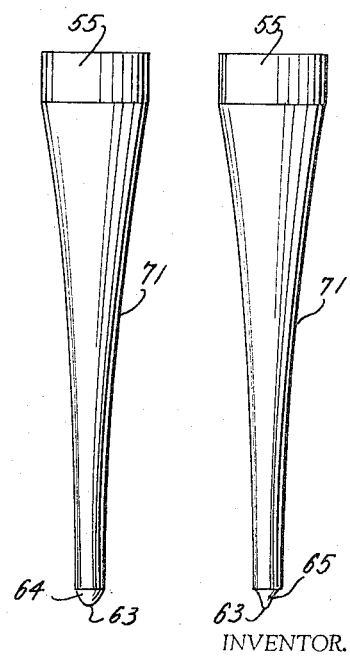
FIG. 8 is a side elevational view of an alternative form of the tool head with curved sides and with a point impact face.
FIG. 9 is an edge elevational view of the tool of FIG. 8.

In FIGS. 8 and 9, there is a structural point impact face at 63 which is widened in side view at 64 and narrow in edge view at 65.

In FIGS. 2 to 5, the sides of the cone are straight as indicated at 66, 67, 68 and 69.

Figure 6:
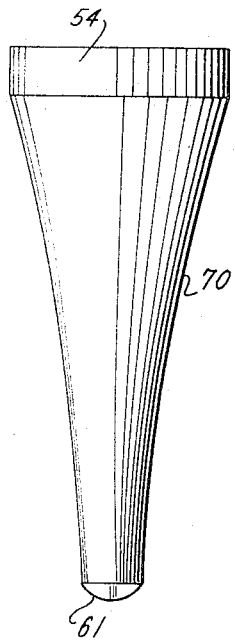
FIG. 6 is a side elevational view of a conical tool head similar to FIG. 3 but inwardly curved side face portions.

On the other hand in FIGS. 6 to 9, the sides of the cone are curved convergently downwardly as indicated at 70 in the tool of FIGS. 6 and 7 and at 71 in the tool of FIGS. 8 and 9.

In the tools of FIGS. 10 and 11, there is shown a bar sealing element 72 in FIG. 10 and 73 in FIG. 11.

The bar element in FIG. 10 consists of a wedged shaped bar having a wide top flat face 74 wedge shaped converging downwardly as indicated at 75 with a long narrow edge at 76 of about 3″ in length and 1/8″ in width maximum.

In FIG. 11 the bar 73 consists of a blade having a long rectangular contact edge 77 which is joined at 78 to the lower end of the in-curved face 79 which terminates in the cylindrical head 80.

These bar sealing devices are particularly useful with thicker plastic sheet materials.

Normally, sharp blades such as indicated at 59, 60 and 61 may be used for cutting purposes whereas the impact face 58 may be used for spot sealing and the bar contact edges 76 and 77 may be used for elongated seals.

Figure 2:
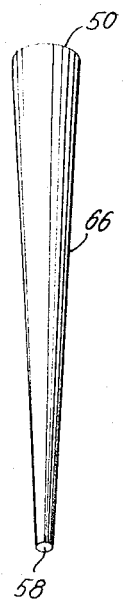
FIG. 2 is a tapered conical tool head with a circular impact face in perspective view.

Preferably the tool heads of FIGS. 2 and 11 are desirably held still while the sheet plastic material is moved below them but the reverse operation may be achieved.

The various tools as shown in FIGS. 2 to 11 may have a weight ranging from 10 ounces to three pounds or more so that the applied weight pressing the sheet or fabric being cut or sealed will approximate seven to fifteen pounds.

This is particularly suitable for cutting various types of Dacron, nylon or Orlon fabrics.

Generally the various types of acrylic fabrics or polyethylene or polyethylene terephthalate fabrics may be employed.

With a cutting tool and with the cut edges being sealed to prevent unraveling, the blade as shown in FIG. 1 should not be sharp and should be ground completely blunt so that it will effectively seal the cut edges.

The blade and the anvil against which it acts may be both constructed of an extremely hard material such as tungsten carbide to resist the concentrated hammering action.

Normally the rate of vibration should be above 18,000 cycles per second and below 50,000 cycles, with the preferred frequency being 25,000 cycles.

Among the various types of materials that are most satisfactorily worked upon are polyethylene terephthalate, also known as Mylar, ranging in thickness from 1/4 mil to 10 mils, polyethylene coated Mylar, polyvinyl chloride, polypropylene and polyethylene.

These materials are more preferred than cellophane, sheet rubber, whether synthetic or natural, and cellulose acetate or butyrate.

Fluorinated hydrocarbon sheets are generally not most satisfactory.

Woven nylon, Dacron and Orlon are also satisfactorily processed.

The important factor is that the energy of the ultrasonic vibration is concentrated down to a ball or point, which results in fusing the two sealed edges together, which desirably may be overlapped and crushed down to the same thickness at the overlap.

Generally, where overlapping alone is desired, the weight of two to four pounds may be applied, whereas when sealing is desired a weight of six to eight pounds may be employed.

The preferred tools are made of a Monel metal alloy.

In general, in sealing the tool is applied so that two sandwiched pieces of plastic material are hammered together against a plastic anvil.

Generally, where a semicircular blade is employed, it may be about 1/16 of an inch wide and frequently made of tungsten carbide.

As many changes could be made in the above ultrasonic sealing arrangement, and many widely different embodiments of this invention could be made without departing from the scope of the claim, it is intended that all matter contained in the above description shall be interpreted as illustrative and not in a limiting sense.

Having now particularly described and ascertained the nature of the invention, and in what manner the same is to be performed, what is claimed is:

An ultrasonic plastic sheet material sealing machine having a transducer with a vertical axis, a counterbalance for balancing the weight of the transducer, a flat anvil and a tool for ultrasonic sealing comprising a heavy metal structure of downwardly convergent inwardly curved side wall having a vertical conical cross-section and a horizontal circular cross-section with a reduced diameter active tip and enlarged carrier mounting portion of decreasing diameter toward the work, with downwardly convergent curved sides, said active tip consisting of a narrow, thin, projecting semicylindrical blade.

References Cited by the Examiner

UNITED STATES PATENTS

| | | | |
|---|---|---|---|
| 2,124,024 | 7/1938 | Alkin | 32—53 |
| 2,215,222 | 9/1940 | Levy | 32—53 |
| 2,602,360 | 7/1952 | Berninger | 81—52.35 |
| 2,787,178 | 4/1957 | Maxim | 81—52.35 |
| 2,814,167 | 11/1957 | Nichols et al. | 51—59 |
| 2,815,692 | 12/1957 | Daniels | 81—52.35 |
| 2,818,686 | 1/1958 | Weiss | 175—56 X |
| 2,831,668 | 4/1958 | Skowronski | 175—56 X |
| 2,874,470 | 2/1959 | Richards | 32—58 |
| 2,893,692 | 7/1959 | Marx | 175—56 |
| 2,941,429 | 6/1960 | Mason | 81—52.35 |
| 2,990,616 | 7/1961 | Balamuth et al. | 32—26 |
| 2,991,594 | 11/1961 | Brown et al. | 51—59 |
| 3,022,814 | 2/1962 | Bodine | 156—73 |
| 3,036,482 | 5/1962 | Kenworthy et al. | 81—52.35 |
| 3,076,904 | 2/1963 | Kleesattel et al. | 310—26 |
| 3,124,878 | 3/1964 | Bodine et al. | 32—26 |
| 3,133,351 | 5/1964 | Von Seggern | 32—26 |

HAROLD ANSHER, *Primary Examiner.*

ALEXANDER WYMAN, *Examiner.*